United States Patent
Seong et al.

(10) Patent No.: US 10,991,977 B2
(45) Date of Patent: *Apr. 27, 2021

(54) METHOD OF MANUFACTURING HIGH-ION CONDUCTIVE SULFIDE-BASED SOLID ELECTROLYTE USING DISSOLUTION-PRECIPITATION AND COMPOSITION USED THEREFOR

(71) Applicants: Hyundai Motor Company, Seoul (KR); Kia Motors Corporation, Seoul (KR); Industry-University Cooperation Foundation Hanyang University, Seoul (KR)

(72) Inventors: Ju Yeong Seong, Hwaseong-si (KR); In Woo Song, Anyang-si (KR); Hong Seok Min, Yongin-si (KR); Yong Jun Jang, Seongnam-si (KR); Yun Sung Kim, Seoul (KR); Dong Wook Shin, Seongnam-si (KR); Sun Ho Choi, Incheon (KR); Ji U Ann, Namyangju-si (KR); Ji Yae Do, Seoul (KR); Seung Woo Lim, Seoul (KR)

(73) Assignees: HYUNDAI MOTOR COMPANY, Seoul (KR); KIA MOTORS CORPORATION, Seoul (KR); Industry-University Cooperation Foundation Hanyang University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,796

(22) Filed: Oct. 23, 2019

(65) Prior Publication Data
US 2020/0176814 A1   Jun. 4, 2020

(30) Foreign Application Priority Data
Nov. 30, 2018  (KR) .......... 10-2018-0151746

(51) Int. Cl.
*H01M 10/0562* (2010.01)
*C01B 25/14* (2006.01)

(52) U.S. Cl.
CPC ......... *H01M 10/0562* (2013.01); *C01B 25/14* (2013.01); *C01P 2002/30* (2013.01); *C01P 2002/72* (2013.01); *C01P 2002/82* (2013.01); *C01P 2006/40* (2013.01); *H01M 2300/0068* (2013.01)

(58) Field of Classification Search
CPC ...... H01M 10/0562; H01M 2300/0068; C01B 25/14; C01P 2002/82; C01P 2006/40; C01P 2002/72; C01P 2002/30
See application file for complete search history.

(56) References Cited

U.S. PATENT DOCUMENTS

| | | | |
|---|---|---|---|
| 2001/0023237 A1* | 9/2001 | Bijl | D06L 4/13 510/367 |
| 2003/0080028 A1* | 5/2003 | Tian | C10G 21/27 208/313 |
| 2013/0295469 A1* | 11/2013 | Liang | H01M 4/1397 429/335 |
| 2015/0093652 A1* | 4/2015 | Aihara | H01M 10/0525 429/322 |
| 2016/0260963 A1* | 9/2016 | Suzuki | H01M 4/0471 |
| 2019/0074542 A1* | 3/2019 | Makino | H01B 13/00 |
| 2019/0386322 A1* | 12/2019 | Yawata | H01M 6/18 |
| 2020/0153042 A1* | 5/2020 | Mimura | H01M 10/056 |

\* cited by examiner

*Primary Examiner* — Muhammad S Siddiquee
(74) *Attorney, Agent, or Firm* — Brinks Gilson & Lione

(57) ABSTRACT

A method of manufacturing a high-ion conductive sulfide-based solid electrolyte using dissolution-precipitation includes preparing a composite solvent including a first solvent including a cyano group and a second solvent having a polarity index of less than 4, introducing a raw material including lithium sulfide ($Li_2S$) and phosphorus pentasulfide ($P_2S_5$) into the composite solvent, and stirring the raw material to obtain a sulfide precipitate.

18 Claims, 10 Drawing Sheets

METHOD OF MANUFACTURING HIGH-ION CONDUCTIVE SULFIDE-BASED SOLID ELECTROLYTE USING DISSOLUTION-PRECIPITATION AND COMPOSITION USED THEREFOR

CROSS-REFERENCE TO RELATED APPLICATION

This application claims, under 35 U.S.C. § 119(a), the benefit of priority to Korean Patent Application No. 10-2018-0151746 filed on Nov. 30, 2018, the entire contents of which are incorporated herein by reference.

BACKGROUND

(a) Technical Field

The present disclosure relates to a method of manufacturing a high-ion conductive sulfide-based solid electrolyte using dissolution-precipitation and a composition used therefor.

(b) Background Art

Secondary batteries, which can be charged and discharged, are used for large-sized transportation means, such as hybrid vehicles and electric vehicles, as well as small-sized electronic devices, such as mobile phones and laptop computers. For this reason, there is a necessity to develop a secondary battery having higher stability and energy density.

Secondary batteries are manufactured based on an organic solvent (e.g. an organic liquid electrolyte), whereby there are limitations on the extent to which the stability and energy density thereof can be improved.

Meanwhile, an all-solid-state battery, which uses an inorganic solid electrolyte, is based on technology that obviates an organic solvent. Consequently, it is possible to manufacture an all-solid-state battery that is safer and simpler, and therefore the all-solid-state battery has attracted considerable attention in recent years.

Solid electrolytes are classified into an oxide-based solid electrolyte and a sulfide-based solid electrolyte. The sulfide-based solid electrolyte exhibits higher lithium ion conductivity than the oxide-based solid electrolyte. In addition, sulfide-based solid electrolyte exhibits high ductility. Consequently, the sulfide-based solid electrolyte has processing flexibility, and therefore the sulfide-based solid electrolyte may be used for various purposes. US Patent Application Publication No. US 2015/0093652 discloses a method of making sulfide solid electrolyte.

The above information disclosed in this Background section is provided only for enhancement of understanding of the background of the invention and therefore it may contain information that does not form the prior art that is already known in this country to a person of ordinary skill in the art.

SUMMARY OF THE DISCLOSURE

It is an aspect of the present invention to provide a method of manufacturing a high-ion conductive sulfide-based solid electrolyte that is capable of reducing processing time and preventing impurities from remaining in a final product and a composition used therefor.

One aspect of the present invention provides a composition for preparing a sulfide-based solid electrolyte, the composition including a composite solvent including a first solvent including a cyano group and a second solvent having a polarity index of less than 4 and a raw material including lithium sulfide ($Li_2S$) and phosphorus pentasulfide ($P_2S_5$).

The first solvent may be acetonitrile.

The second solvent may be selected from the group consisting of isopropyl alcohol, 2-butanol, and a combination thereof.

The composite solvent may include 99.975 wt % or more to less than 100 wt % of a first solvent and more than 0 wt % to 0.025 wt % or less of a second solvent.

The raw material may further include lithium halide (LiX, wherein X is a halogen element).

The raw material may include 50 mol % to 62.5 mol % of lithium sulfide ($Li_2S$), 12.5 mol % to 20 mol % of phosphorus pentasulfide ($P_2S_5$), and 25 mol % to 37.5 mol % of lithium halide (LiX).

Another aspect of the present invention provides a method of manufacturing a sulfide-based solid electrolyte, the method including preparing a composite solvent including a first solvent including a cyano group and a second solvent having a polarity index of less than 4, introducing a raw material including lithium sulfide ($Li_2S$) and phosphorus pentasulfide ($P_2S_5$) into the composite solvent, and stirring the raw material to obtain a sulfide precipitate.

The method may further include removing the composite solvent.

The method may further include thermally treating the sulfide precipitate to crystallize the sulfide precipitate after removing the composite solvent.

The first solvent may be acetonitrile.

The second solvent may be selected from the group consisting of isopropyl alcohol, 2-butanol, and a combination thereof.

The composite solvent may include 99.975 wt % or more to less than 100 wt % of a first solvent and more than 0 wt % to 0.025 wt % or less of a second solvent.

The raw material may further include lithium halide (LiX, where X is a halogen element).

The raw material may include 50 mol % to 62.5 mol % of lithium sulfide ($Li_2S$), 12.5 mol % to 20 mol % of phosphorus pentasulfide ($P_2S_5$), and 25 mol % to 37.5 mol % of lithium halide (LiX).

The stirring may be performed at a temperature of 30 to 80° C.

The stirring may include first stirring performed under conditions of 100 to 150 rpm and 5 to 10 minutes and second stirring performed under conditions of 250 to 300 rpm and 18 to 48 hours.

The first stirring and the second stirring may be continuously performed.

The composite solvent may be removed through vacuum drying under conditions of 30 to 80° C. and 1 to 24 hours.

The sulfide precipitate may be crystallized through heat treatment performed under conditions of 300 to 550° C. and 1 to 48 hours.

The sulfide-based solid electrolyte may have an argyrodite-type crystalline structure.

Other aspects and embodiments of the invention are discussed infra.

BRIEF DESCRIPTION OF THE DRAWINGS

The above and other features of the present invention will now be described in detail with reference to embodiments thereof illustrated in the accompanying drawings which are given hereinbelow by way of illustration only, and thus are not limitative of the present invention, and wherein.

Figure 1:
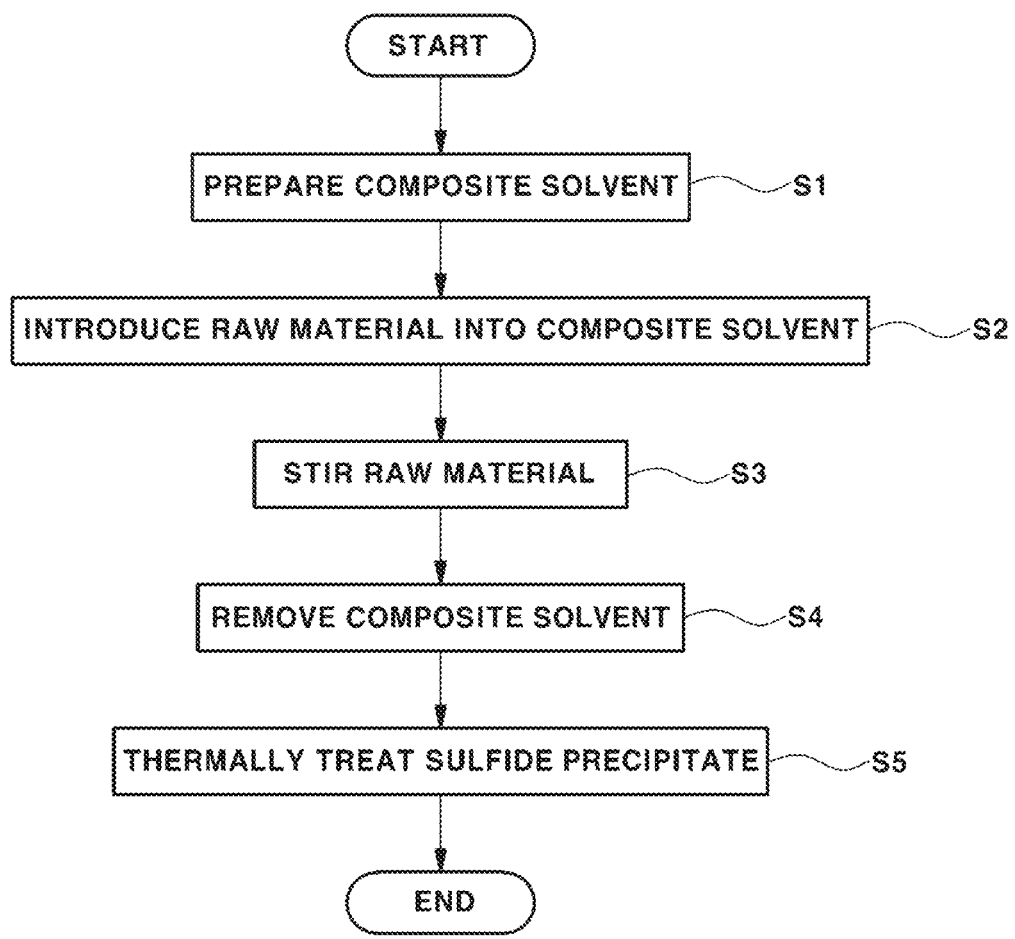
FIG. 1 is a view showing a method of manufacturing a sulfide-based solid electrolyte according to embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The aspects, features and advantages of the invention will be clearly understood from embodiments with reference to the annexed drawings. However, the present invention is not limited to the embodiments, and may be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element, and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

One implementation in making sulfide solid electrolyte provides a method of reacting lithium sulfide ($Li_2S$) and phosphorus pentasulfide ($P_2S_5$) in a polar organic solvent, which is suitable for mass-producing a sulfide-based solid electrolyte. However, the above method has a shortcoming in that processing time is increased. In addition, it is not easy to remove impurities, such as lithium sulfide ($Li_2S$), which has low solubility, and organic residuals, since the above method aims to manufacture a sulfide-based solid electrolyte through a chemical reaction of a starting material, unlike a mechanical milling method. As a result, a large amount of lithium sulfide ($Li_2S$) remains in the final product. The residual lithium sulfide reacts with moisture and reduces the electrochemical stability of lithium.

Referring to FIG. 1, a method of manufacturing a sulfide-based solid electrolyte according to embodiments of the present invention includes a step of preparing a composite solvent including a first solvent including a cyano group and a second solvent having a polarity index of less than 4 (S1), a step of introducing a raw material including lithium sulfide ($Li_2S$) and phosphorus pentasulfide ($P_2S_5$) into the composite solvent (S2) to form a mixture, a step of stirring the mixture to obtain a sulfide precipitate (e.g., $Li_6PS_5Cl$) (S3), a step of removing the composite solvent (S4), and a step of thermally treating the sulfide precipitate to crystallize the sulfide precipitate (S5).

The composite solvent may include a first solvent having a relatively high polarity index and a second solvent having a relatively low polarity index. Here, the term "polarity index" generally means the degree of polarity of a solvent, and ranges from 0, which indicates non-polarity, to 10.

The first solvent may be an aprotic solvent having a high polarity index. Specifically, the first solvent may be a solvent that includes a cyano group and has a polarity index of 5 or higher. More specifically, the first solvent may be acetonitrile. Acetonitrile has a polarity index of 5.8.

As for the raw material, phosphorus pentasulfide ($P_2S_5$) is soluble in the first solvent, whereas the lithium sulfide ($Li_2S$) is insoluble in the first solvent. When the raw material is stirred in the first solvent, a reaction occurs between lithium sulfide ($Li_2S$) particles and phosphorus pentasulfide ($P_2S_5$) in the solvent medium, which has been dissolved in the first solvent, whereby a sulfide precipitate is formed. During the reaction, impurities may be generated due to a precursor having low solubility, such as $Li_2S$ or $LiCl$.

In embodiments of the present invention, a small amount of a second solvent having a relatively low polarity index, such as an alcohol-based solvent, is added to the second solvent in order to prevent the occurrence of such a side reaction. For the first solvent, a dipole-dipole interaction occurs due to a high dipole moment. When a solvent having a polarity index of less than 4 is added to the first solvent, the dipole-dipole interaction becomes weak, thereby preventing the occurrence of the side reaction. In addition, the solubility of the precursor is increased, and therefore the amount of barrier energy necessary to form a crystalline structure is reduced, thereby preventing the side reaction.

The second solvent may be an alcohol-based solvent that has a polarity index of less than 4 and includes a hydroxyl group. Specifically, the second solvent may be selected from the group consisting of isopropyl alcohol (IPA), 2-butanol, and a combination thereof. Isopropyl alcohol (IPA) has a polarity index of 3.9, and 2-butanol has a polarity index of 3.8.

The composite solvent may include 99.975 wt % or more to less than 100 wt % of a first solvent and more than 0 wt % to 0.025 wt % or less of a second solvent. In embodiments, the content of the second solvent is equal to or less than 0.025 wt % to avoid or minimize the possibility that the second solvent acts as an impurity. When the second solvent acts as an impurity, it is possible that the sulfide-based solid electrolyte is not uniformly composed, or the composition of the raw material may stoichiometrically deviate, whereby impurities may be generated.

The raw material may include lithium sulfide ($Li_2S$) and phosphorus pentasulfide ($P_2S_5$). The content of each of lithium sulfide ($Li_2S$) and phosphorus pentasulfide ($P_2S_5$) is not particularly restricted. Preferably, however, the raw material includes 60 mol % to 80 mol % of lithium sulfide ($Li_2S$) and 20 mol % to 40 mol % of phosphorus pentasulfide ($P_2S_5$).

In addition, the raw material may include 50 mol % to 62.5 mol % of lithium sulfide ($Li_2S$), 12.5 mol % to 20 mol % of phosphorus pentasulfide ($P_2S_5$), and 25 mol % to 37.5 mol % of lithium halide (LiX).

Lithium halide may be selected from the group consisting of LiCl, LiBr, LiI, and combinations thereof. Preferably, the lithium halide is LiCl.

A composition for preparing the sulfide-based solid electrolyte according to embodiments of the present invention includes the composite solvent and the raw material. When stirring, a description of which will follow, is performed using the composition, it is possible to obtain the sulfide-based solid electrolyte. The composite solvent and the raw material were previously described, and therefore a further description thereof will be omitted.

When the mixture of the raw material and the composite solvent is stirred, a reaction occurs of the raw material in the solvent medium, as described above, thereby composing and precipitating the amorphous sulfide-based solid electrolyte (S3). In this specification, the amorphous sulfide-based solid electrolyte is referred to as a sulfide precipitate. The composite solvent may be supplied into a reactor or a chamber having stirring blades of a predetermined shape, the raw material may be introduced into the composite solvent, and the stirring blades may be rotated for stirring.

The stirring may be performed at a temperature of 30 to 80° C. If the stirring temperature is too low, the raw material may not sufficiently react. In embodiments, the stirring temperature is equal to or greater than 30° C. for sufficient reaction of the raw material. If the stirring temperature is too high, a side reaction may occur, whereby impurities may be generated. In embodiments, the stirring temperature is equal to or greater than 30° C. for sufficient reaction of the raw material, and the stirring temperature is equal to or less than 80° C. for avoiding a side reaction which may cause generation of impurities.

In addition, first stirring may be performed under conditions of 100 to 150 rpm and 5 to 10 minutes, and second stirring may be performed under conditions of 250 to 300 rpm and 18 to 48 hours.

The first stirring is performed in order to uniformly mix the raw material and to prevent the raw material from sticking. To this end, the first stirring must be performed in the state in which the above-defined conditions are satisfied.

The second stirring is performed in order to control the particle size of the sulfide precipitate. In the case in which the stirring speed of the second stirring is 250 to 300 rpm, the particle size of the sulfide precipitate is most uniform. If the stirring time of the second stirring is too short, the raw material may not sufficiently react. If the stirring time of the second stirring is too long, the processing time may be excessively increased, and side reactions may occur, whereby impurities may be generated. In embodiments, the stirring time of the second stirring is equal to or more than 18 hours for sufficient reaction of the raw material with the solvent, and the stirring time of the second stirring is equal to or less than 48 hours for avoiding or minimizing excessive increase of the processing time, and occurrence of side reactions which may cause impurities to be generated.

In embodiments, the first stirring and the second stirring are continuously performed in order to improve processing convenience and to shorten the processing time. However, the present invention is not limited thereto. The first stirring and the second stirring may be intermittently performed due to the addition of an additive or for processing reasons.

After the sulfide precipitate is obtained through the stirring, the composite solvent may be removed (S4).

The composite solvent may be removed through vacuum drying under conditions of 30 to 80° C. and 1 to 24 hours. In order to prevent or inhibit impurities from being generated due to side reactions, the above-defined conditions must be satisfied.

In embodiments, the vacuum drying is performed such that the sulfide precipitate is prevented or inhibited from contacting the air, since the sulfide precipitate even reacts with moisture in the air.

After the composite solvent is removed, the sulfide precipitate may be crystallized through heat treatment (S5). As previously described, the sulfide precipitate is an amorphous sulfide-based solid electrolyte. When the sulfide precipitate is thermally treated at a specific temperature for a specific amount of time, the atomic arrangement of the sulfide precipitate is changed to become regular, whereby the sulfide precipitate has a specific crystalline structure.

The heat treatment may be performed under conditions of 300 to 550° C. and 1 to 48 hours. In addition, the heat treatment may be performed in an inactive atmosphere, such as argon or nitrogen, or in a vacuum atmosphere. In the case in which the sulfide precipitate is thermally treated under the above-defined conditions, it is possible to obtain a crystalline sulfide-based solid electrolyte including a crystalline phase having an argyrodite-type crystalline structure.

As described above, the present invention relates to a method of composing a sulfide-based solid electrolyte having a novel composition using a new raw material. Hereinafter, the present invention will be described in more detail with reference to concrete examples. However, the following examples are merely illustrations to assist in understanding the present invention, and the present invention is not limited by the following examples.

Example 1

(S1) 0.025 wt % of isopropyl alcohol (IPA), which is an alcohol-based solvent having a polarity index of 3.9, (a second solvent) was added to 99.975 wt % of acetonitrile (a first solvent), and the solvents were mixed at 150 rpm for about 10 minutes to prepare a composite solvent.

(S2) A raw material including lithium sulfide ($Li_2S$), phosphorus pentasulfide ($P_2S_5$), and lithium chloride (LiCl) was introduced into the composite solvent. At this time, the raw material was weighed and introduced to obtain the final product, i.e. a sulfide-based solid electrolyte, according to Chemical Formula 1 below.

$$Li_6PS_5Cl \quad \text{[Chemical Formula 1]}$$

(S3) First stirring was performed on the raw material under conditions of 150 rpm and 5 minutes, and second stirring was performed on the raw material under conditions of 280 rpm and 24 hours to obtain a sulfide precipitate. The first stirring and the second stirring were continuously performed.

(S4) After the stirring was finished, vacuum drying was performed at an ambient temperature (25° C.) for about 24 hours to remove the composite solvent.

(S5) After the composite solvent was removed, the sulfide precipitate was thermally treated under conditions of 550° C. and 5 hours to obtain a crystalline sulfide-based solid electrolyte.

Example 2

A crystalline sulfide-based solid electrolyte was manufactured using the same method as Example 1 except that 2-butanol, having a polarity index of 3.8, was used as the second solvent.

Comparative Example 1

A crystalline sulfide-based solid electrolyte was manufactured using the same method as Example 1 except that 1-propanol, having a polarity index of 4, was used as the second solvent.

Comparative Example 2

A crystalline sulfide-based solid electrolyte was manufactured using the same method as Example 1 except that ethanol, having a polarity index of 5.2, was used as the second solvent.

Comparative Example 3

A crystalline sulfide-based solid electrolyte was manufactured using the same method as Example 1 except that only acetonitrile was used as a single solvent, without using a second solvent.

Experimental Example 1—Measurement of Lithium Ion Conductivity

The ion conductivity of each of the sulfide-based solid electrolytes according to Examples 1 and 2 and Comparative Examples 1 to 3 was measured. Specifically, each of the sulfide-based solid electrolytes was compressed to form a sample for measurement (having a diameter of 13 mm and a thickness of 1 to 1.5 mm). An alternating-current potential of 10 mV was applied to the sample in an oven having an ambient temperature maintained therein, and then a frequency sweep of $1\times10^6$ to 1 Hz was performed to measure an impedance value, from which ion conductivity was determined. The results are shown in Table 1 below.

TABLE 1

| Classification | First solvent | | Second solvent | | | Lithium ion conductivity [mS/cm] |
|---|---|---|---|---|---|---|
| | Kind | Content [wt %] | Kind | Polarity index | Content [wt %] | |
| Example 1 | Acetonitrile | 99.975 | Isopropyl alcohol | 3.9 | 0.025 | 2.3 |
| Example 2 | Acetonitrile | 99.975 | 2-butanol | 3.8 | 0.025 | 2.4 |
| Comparative Example 1 | Acetonitrile | 99.975 | 1-propanol | 4.0 | 0.025 | 0.19 |
| Comparative Example 2 | Acetonitrile | 99.975 | Ethanol | 5.2 | 0.025 | 0.64 |
| Comparative Example 3 | Acetonitrile | 100 | — | — | — | 1.5 |

Referring to Table 1 above, it can be seen that each of the sulfide-based solid electrolytes manufactured according to Examples 1 and 2 had remarkably high lithium ion conductivity. For reference, a sulfide-based solid electrolyte disclosed in US Patent Application Publication No. US 2015/0093652, in which the sulfide-based solid electrolyte is manufactured using a dissolution-precipitation method, has a lithium ion conductivity of 1.0 mS/cm, which is much lower than that of each of the sulfide-based solid electrolytes manufactured according to Examples 1 and 2.

Referring to the results of Comparative Examples 1 and 2, it can be seen that lithium ion conductivity was greatly reduced when an alcohol-based solvent having a polarity index of 4 or more was used as the second solvent. The reason for this is that too many side reactions occurred, whereby impurities were generated, which can be more clearly understood from the results of X-ray diffraction analysis, a description of which will follow.

In addition, referring to the result of Comparative Example 3, it can be seen that, when only acetonitrile was used, a dipole-dipole interaction due to a high dipole moment thereof could not be weakened, whereby side reactions occurred and thus impurities were generated, or the solubility of precursors, such as $Li_2S$ or LiCl, could not be reduced, whereby impurities could not be prevented from being generated.

Experimental Example 2—X-Ray Diffraction
(XRD) Analysis

XRD analysis was performed on the sulfide-based solid electrolytes according to Examples 1 and 2 and Comparative Examples 1 to 3. The results are shown in FIGS. 2A to 2E.

Figure 2A:
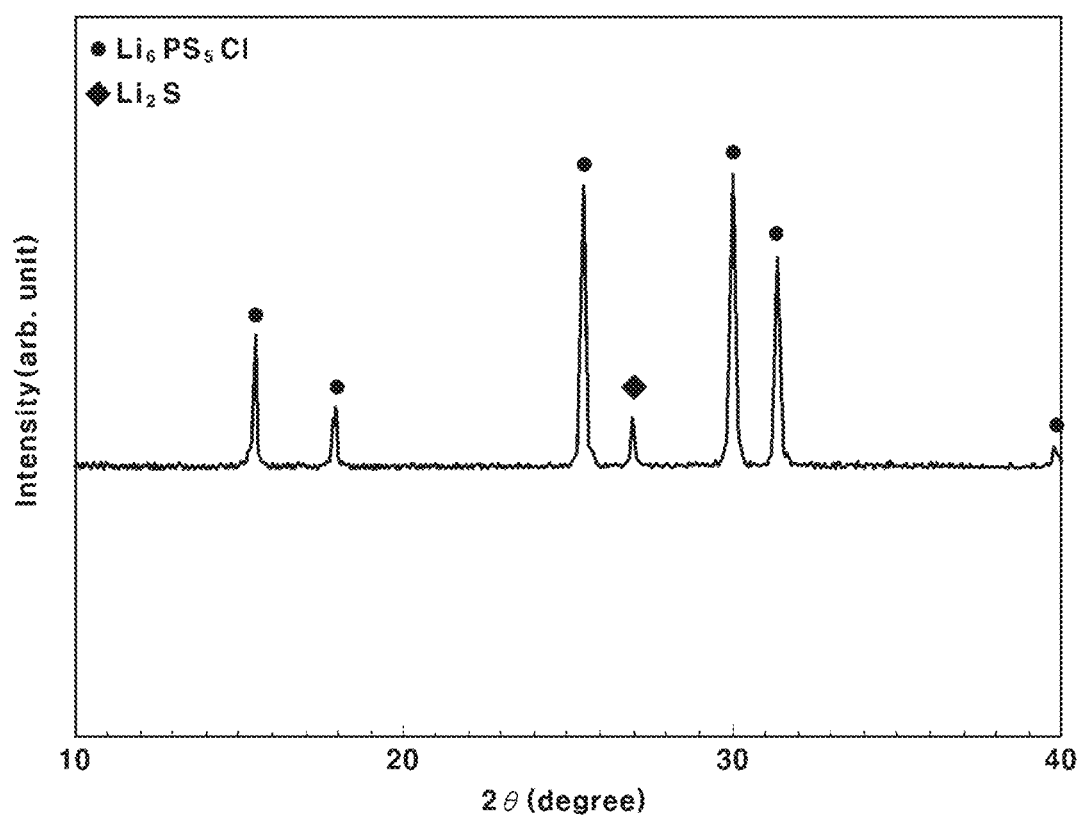
FIGS. 2A to 2E are graphs showing the results of X-ray diffraction analysis of sulfide-based solid electrolytes according to Examples 1 and 2 and Comparative Examples 1 to 3.
Figure 2B:
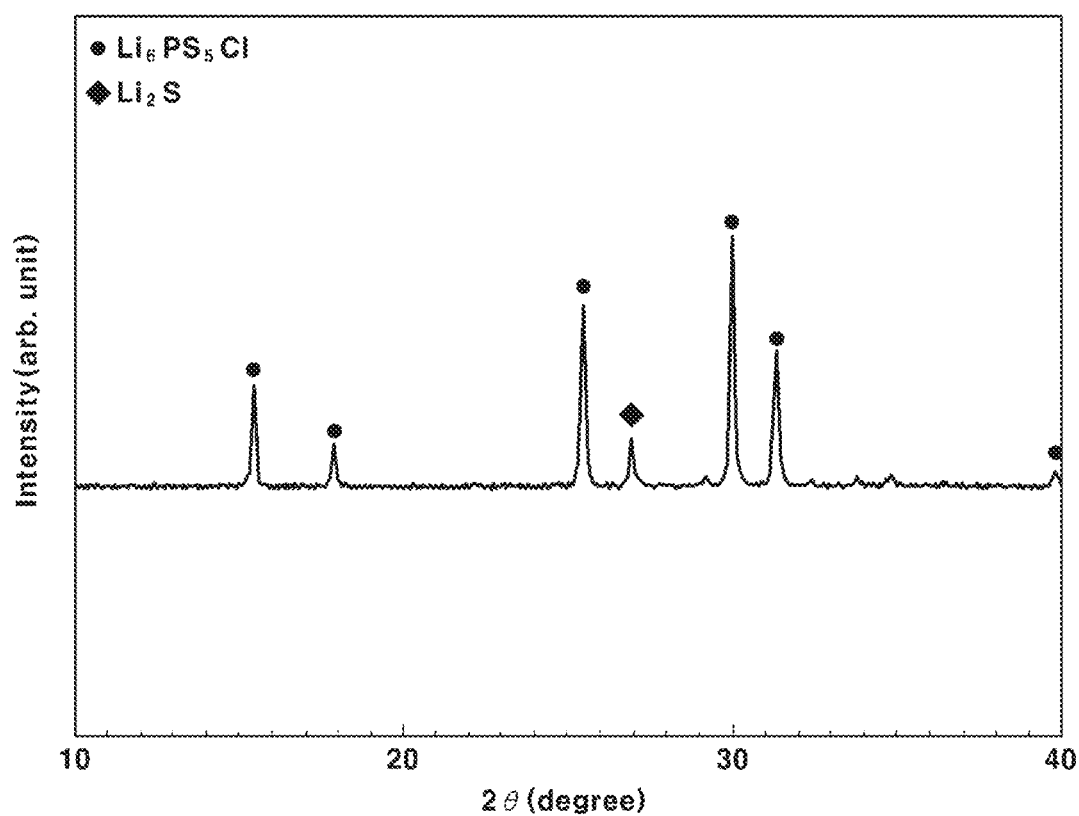
Figure 2C:
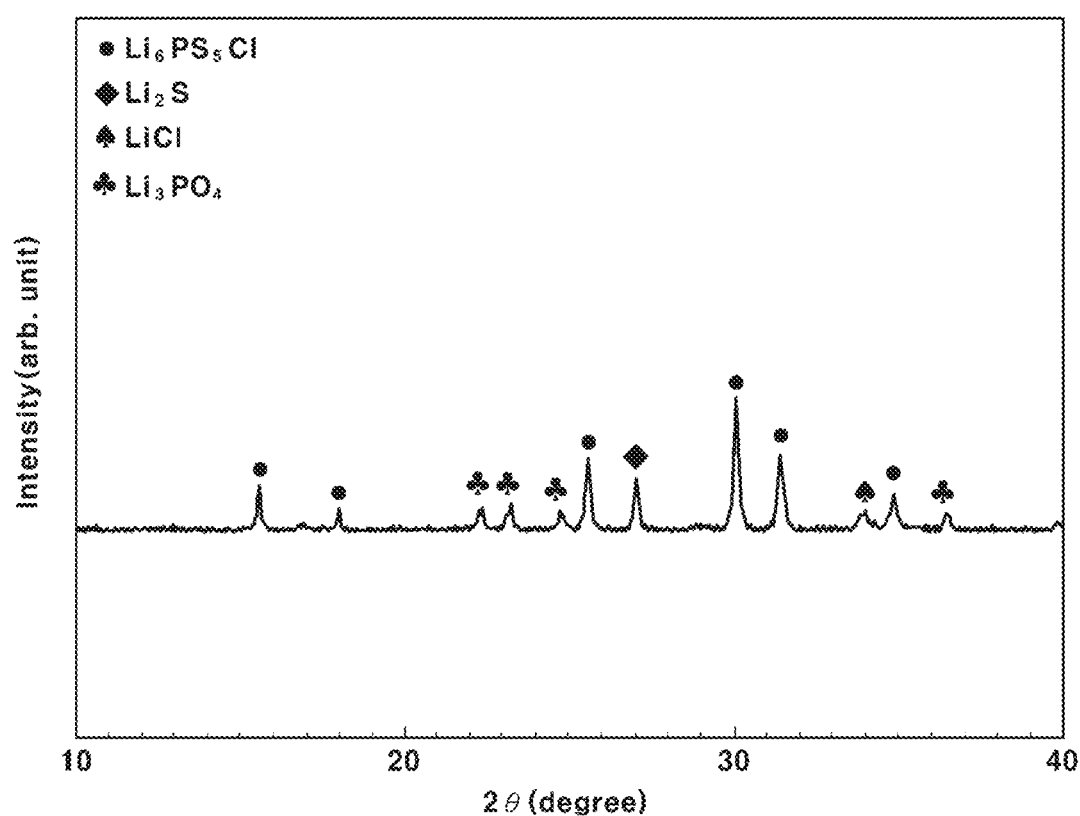
Figure 2D:
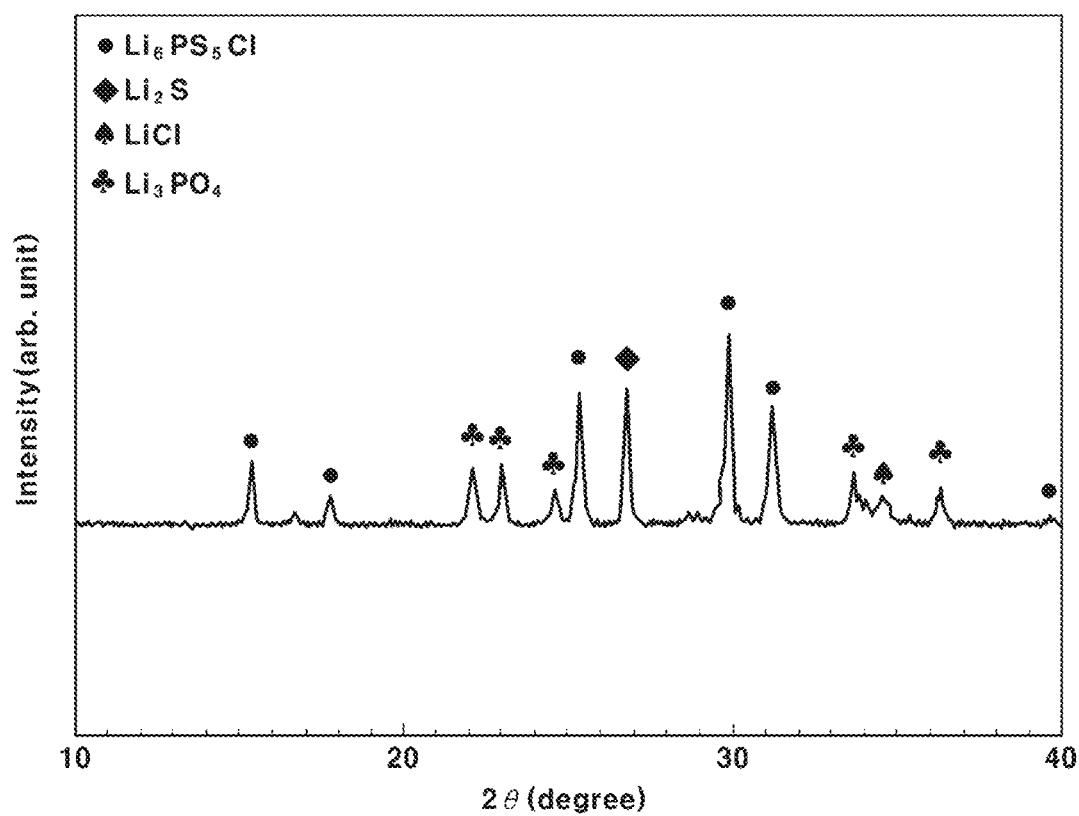
Figure 2E:
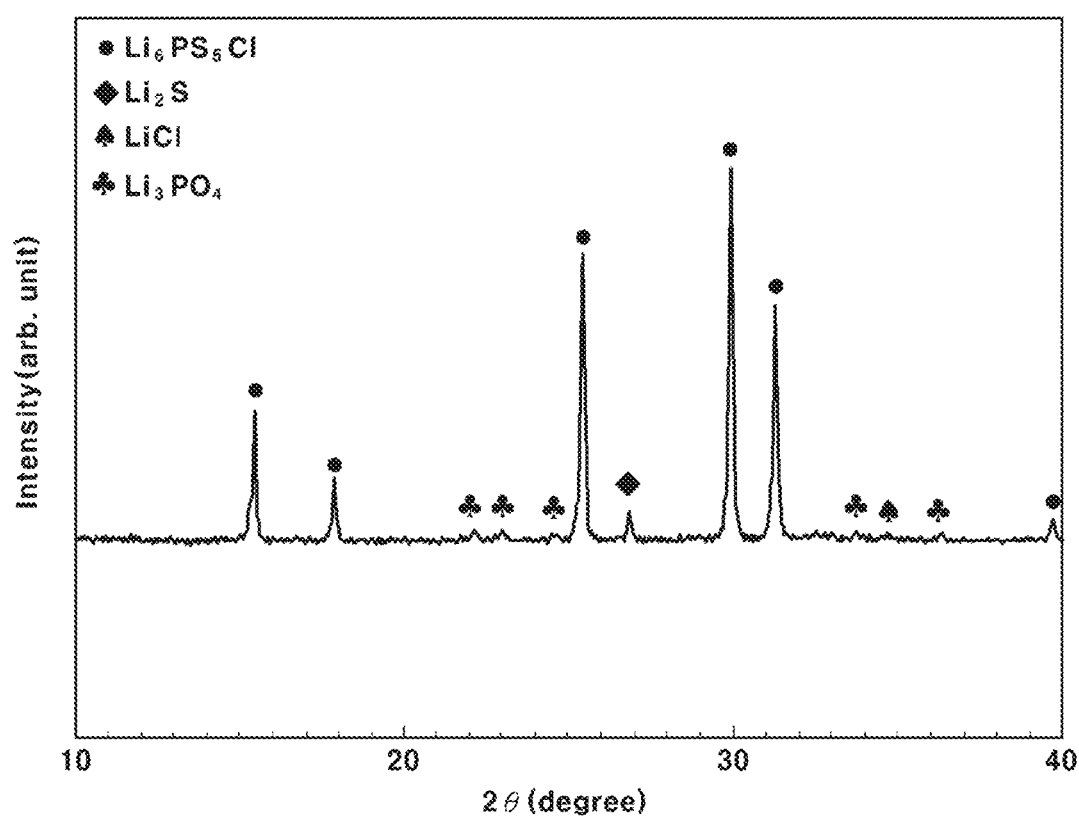

FIG. 2A shows the result of Example 1, FIG. 2B shows the result of Example 2, FIG. 2C shows the result of Comparative Example 1, FIG. 2D shows the result of Comparative Example 2, and FIG. 2E shows the result of Comparative Example 3.

Referring to FIGS. 2A and 2B, it can be seen that each of the sulfide-based solid electrolytes manufactured according to Examples 1 and 2 had no impurity such as $Li_3PO_4$ or LiCl therein.

In contrast, referring to FIGS. 2C to 2E, it can be seen that large amounts of the impurities $Li_3PO_4$ and LiCl were detected.

Consequently, it can be seen that, when a sulfide-based solid electrolyte is manufactured using the method and composition according to embodiments of the present invention, it is possible to prevent or minimize the occurrence of a side reaction, whereby no impurities remain in the sulfide-based solid electrolyte.

Experimental Example 3—Raman Spectroscopic
Analysis

Figure 3:
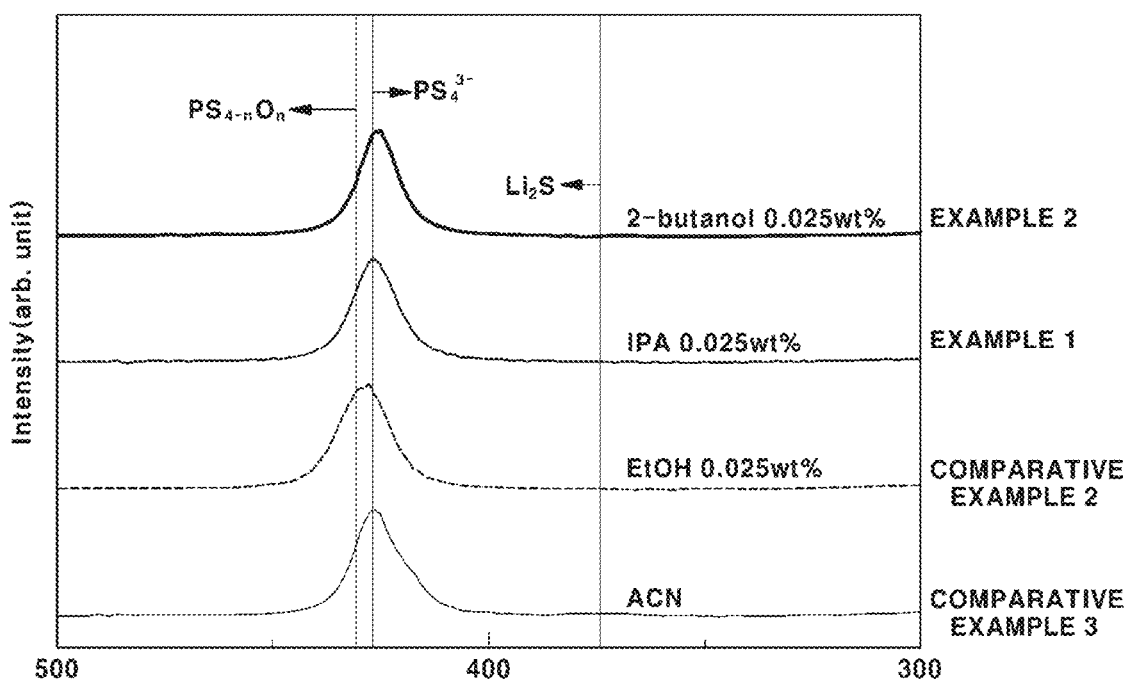
FIG. 3 is a graph showing the results of Raman spectroscopic analysis of the sulfide-based solid electrolytes according to Examples 1 and 2 and Comparative Examples 2 and 3.

Raman spectroscopic analysis was performed on the sulfide-based solid electrolytes according to Examples 1 and 2 and Comparative Examples 1 to 3. Each sample was placed on a sealed holder, and an argon-ion laser having a wavelength of 514 nm was irradiated on the sample to measure the molecular vibration spectrum of the sample for 60 seconds. The results are shown in FIG. 3.

It can be seen that a negative-ion cluster having substituted oxygen was not revealed in each of the sulfide-based solid electrolytes manufactured according to Examples 1 and 2, whereby an impurity such as $Li_3PO_4$ was not present. In addition, it can be seen that each of the sulfide-based solid electrolytes included a crystalline phase having an argyrodite-type crystalline structure from the formation of $PS_4^{3-}$.

In contrast, it can be seen that a negative-ion cluster $PS4^-{}_nO_n$ having substituted oxygen was formed in the sulfide-based solid electrolyte manufactured according to Comparative Example 2, whereby $Li_3PO_4$ was generated as an impurity. In addition, it can be seen that the sulfide-based solid electrolyte manufactured according to Comparative Example 3 included a crystalline phase having an argyrodite-type crystalline structure from the formation of $PS_4^{3-}$, but $Li_2S$ was formed, whereby an impurity remained.

Experimental Example 3—Evaluation of Voltage
Stability

The cyclic voltammetry for voltage stability of each of the sulfide-based solid electrolytes manufactured according to Examples 1 and 2 was evaluated. An indium metal was attached to the sample of each of the sulfide-based solid electrolytes as in Experimental Example 1, and the cyclic voltammetry for voltage stability of each of the sulfide-based solid electrolytes in a range of −1 to 5V was measured under a condition of 20 mV/s. The results are shown in FIGS. 4A and 4B.

Figure 4A:
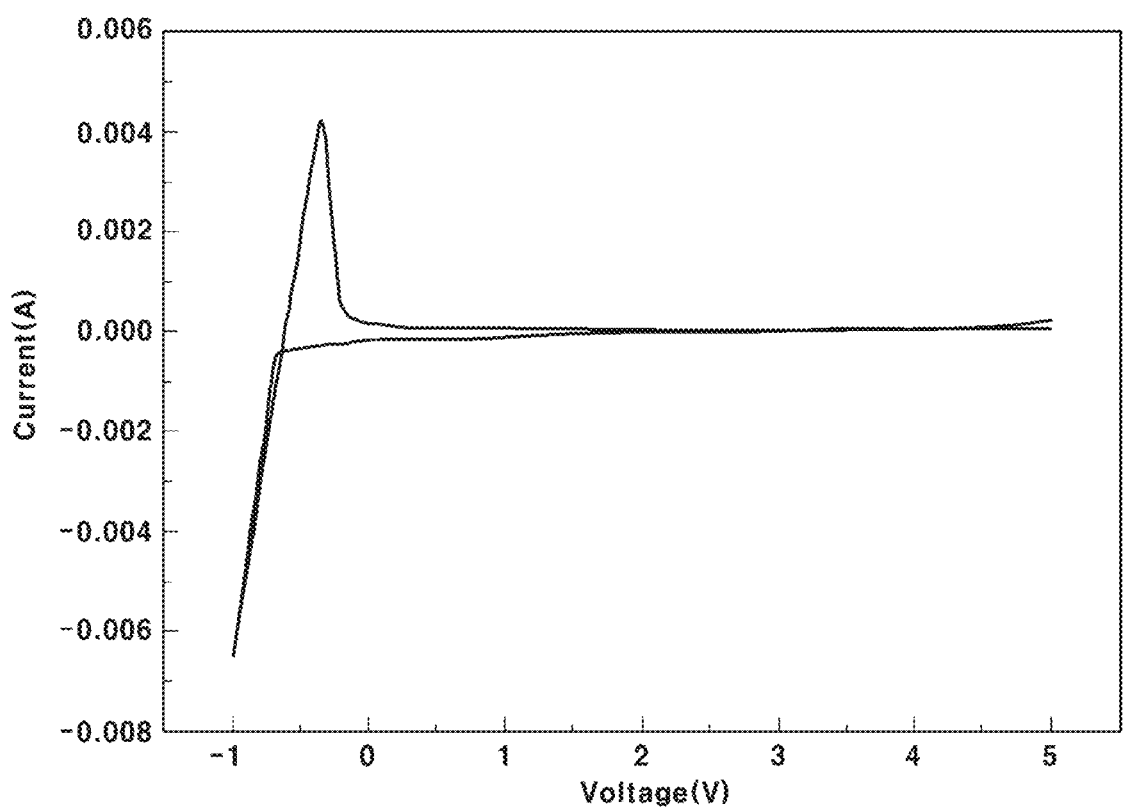
FIGS. 4A and 4B are graphs showing the results of cyclic voltammetry for evaluation of voltage stability of the sulfide-based solid electrolytes according to Examples 1 and 2.
Figure 4B:
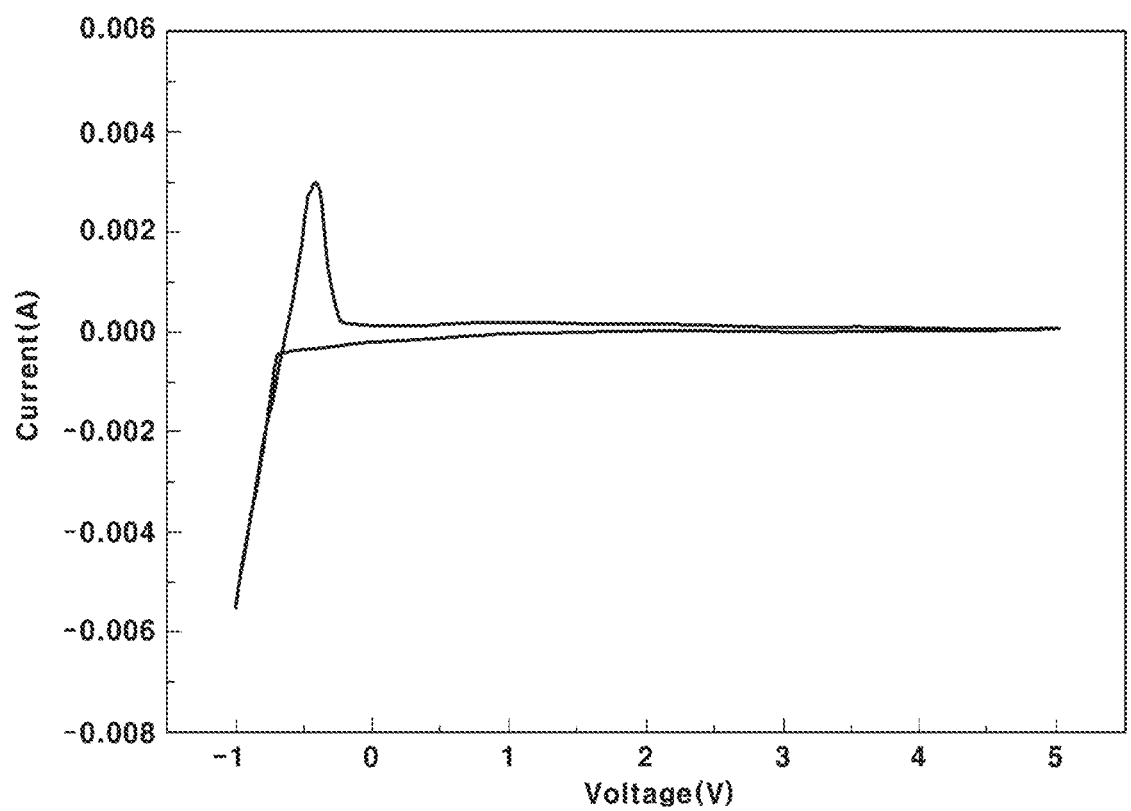

FIG. 4A shows the result of Example 1, and FIG. 4B shows the result of Example 2.

Referring to these figures, no decomposition reaction occurred up to a high voltage of 5V, and therefore it can be seen that, in the case in which the sulfide-based solid electrolyte according to embodiments of the present invention is used, it is an electrochemically stable all-solid-state battery with the sulfide-based solid electrolyte.

Experimental Example 5—Capacity Evaluation

All-solid-state batteries were manufactured using the sulfide-based solid electrolytes according to Examples 1 and 2, and the capacity of each of the all-solid-state batteries was measured.

Specifically, 0.2 g of each of the sulfide-based solid electrolytes was palletized using a mold having a diameter of 16Φ to manufacture a solid electrolyte layer. 0.02 g of a mixture, including 70 wt % of $LiNi_{0.6}Co_{0.2}Mn_{0.2}O_2$ (a positive electrode active material), 28 wt % of the sulfide-based solid electrolyte, and 2 wt % of Super-P (a conductive agent), was applied to one surface of the solid electrolyte layer to manufacture a positive electrode. Indium foil was attached to the other surface of the solid electrolyte layer to manufacture a negative electrode.

Figure 5:
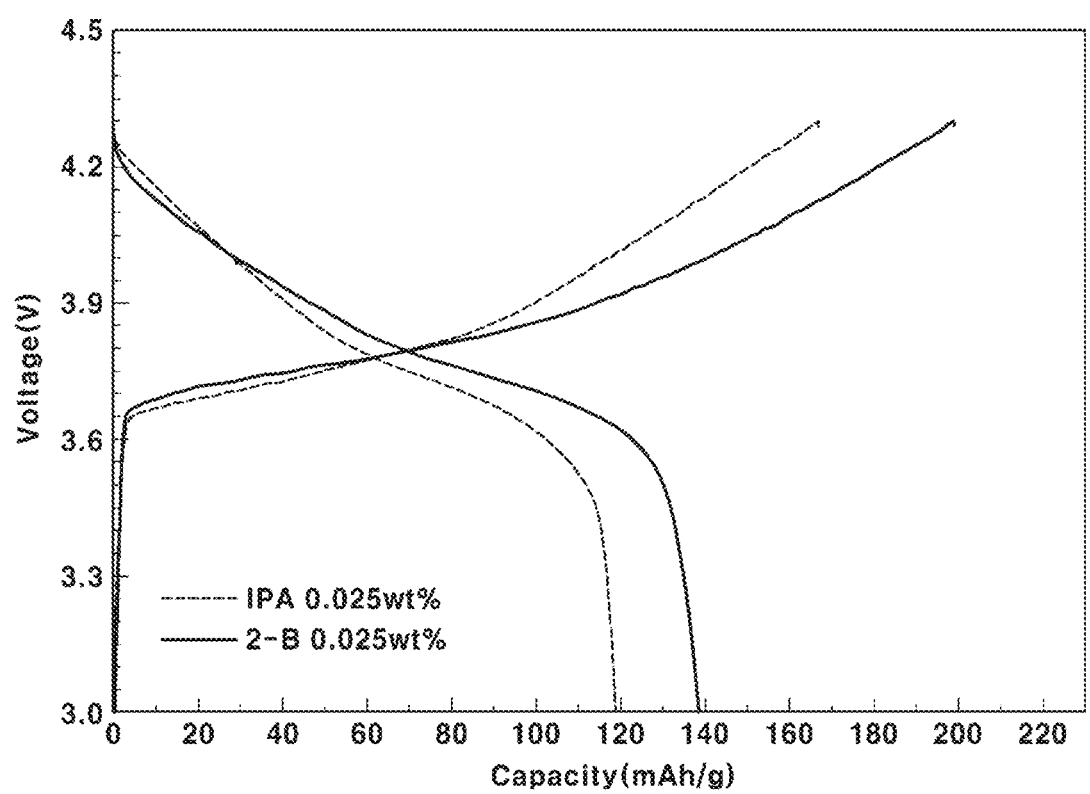
FIG. 5 is a graph showing the results of measurement of the capacities of all-solid-state batteries including the sulfide-based solid electrolytes according to Examples 1 and 2.

The all-solid-state batteries manufactured as described above were charged and discharged under conditions of a 0.1 C-rate and a voltage of 3.0 to 4.3V, compared to Li. The results are shown in FIG. 5. Referring to this figure, it can be seen that the all-solid-state batteries manufactured using the sulfide-based solid electrolytes according to Examples 1 and 2 had capacities of about 120 mAh/g and about 140 mAh/g, respectively.

As is apparent from the foregoing, it is possible to reduce the processing time necessary to manufacture a sulfide-based solid electrolyte. In addition, no impurities remain in the final product, whereby it is possible to improve the ion conductivity and electrochemical stability of the sulfide-based solid electrolyte.

The effects of the present invention are not limited to those mentioned above. It should be understood that the effects of the present invention include all effects that can be inferred from the foregoing description of the present invention.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A composition for preparing a sulfide-based solid electrolyte, the composition comprising:
   a composite solvent comprising a first solvent comprising a cyano group and a second solvent having a polarity index of less than 4; and
   a raw material comprising lithium sulfide ($Li_2S$) and phosphorus pentasulfide ($P_2S_5$),
   wherein the composite solvent comprises 99.975 wt % or more to less than 100 wt % of the first solvent and more than 0 wt % to 0.025 wt % or less of the second solvent.

2. The composition of claim 1, wherein the first solvent is acetonitrile.

3. The composition of claim 1, wherein the second solvent is selected from a group consisting of isopropyl alcohol, 2-butanol, and a combination thereof.

4. The composition of claim 1, wherein the raw material further comprises lithium halide (LiX, wherein X is a halogen element).

5. The composition of claim 4, wherein the raw material comprises 50 mol % to 62.5 mol % of lithium sulfide ($Li_2S$), 12.5 mol % to 20 mol % of phosphorus pentasulfide ($P_2S_5$), and 25 mol % to 37.5 mol % of lithium halide (LiX).

6. A method of manufacturing a sulfide-based solid electrolyte, the method comprising:
preparing a composite solvent comprising a first solvent comprising a cyano group and a second solvent having a polarity index of less than 4;
introducing a raw material comprising lithium sulfide ($Li_2S$) and phosphorus pentasulfide ($P_2S_5$) into the composite solvent to form a mixture; and
stirring the mixture to obtain a sulfide precipitate,
wherein the composite solvent comprises 99.975 wt % or more to less than 100 wt % of the first solvent and more than 0 wt % to 0.025 wt % or less of the second solvent.

7. The method of claim 6, further comprising removing the composite solvent.

8. The method of claim 7, further comprising thermally treating the sulfide precipitate to crystallize the sulfide precipitate after removing the composite solvent.

9. The method of claim 6, wherein the first solvent is acetonitrile.

10. The method of claim 6, wherein the second solvent is selected from a group consisting of isopropyl alcohol, 2-butanol, and a combination thereof.

11. The method of claim 6, wherein the raw material further comprises lithium halide (LiX, wherein X is a halogen element).

12. The method of claim 11, wherein the raw material comprises 50 mol % to 62.5 mol % of lithium sulfide ($Li_2S$), 12.5 mol % to 20 mol % of phosphorus pentasulfide ($P_2S_5$), and 25 mol % to 37.5 mol % of lithium halide (LiX).

13. The method of claim 6, wherein the stirring is performed at a temperature of 30 to 80° C.

14. The method of claim 6, wherein the stirring comprises first stirring performed under conditions of 100 to 150 rpm and 5 to 10 minutes and second stirring performed under conditions of 250 to 300 rpm and 18 to 48 hours.

15. The method of claim 14, wherein the first stirring and the second stirring are continuously performed.

16. The method of claim 6, wherein the composite solvent is removed through vacuum drying under conditions of 30 to 80° C. and 1 to 24 hours.

17. The method of claim 6, wherein the sulfide precipitate is crystallized through heat treatment performed under conditions of 300 to 550° C. and 1 to 48 hours.

18. The method of claim 8, wherein the sulfide-based solid electrolyte has an argyrodite-type crystalline structure.

* * * * *